(12) United States Patent
Ligon

(10) Patent No.: US 9,597,857 B2
(45) Date of Patent: Mar. 21, 2017

(54) ENHANCED FRICTION COATING CONSTRUCTION AND METHOD FOR FORMING SAME

(71) Applicant: Charles R. Ligon, Bradenton, FL (US)

(72) Inventor: Charles R. Ligon, Bradenton, FL (US)

( * ) Notice: Subject to any disclaimer, the term of this patent is extended or adjusted under 35 U.S.C. 154(b) by 244 days.

(21) Appl. No.: 13/694,881

(22) Filed: Jan. 15, 2013

(65) Prior Publication Data

US 2014/0199517 A1 Jul. 17, 2014

Related U.S. Application Data

(60) Provisional application No. 61/600,306, filed on Feb. 17, 2012.

(51) Int. Cl.
| | |
|---|---|
| *C23C 4/06* | (2016.01) |
| *C23C 4/12* | (2016.01) |
| *B32B 7/06* | (2006.01) |
| *C23C 4/08* | (2016.01) |
| *C23C 4/18* | (2006.01) |
| *B32B 7/12* | (2006.01) |
| *B32B 15/02* | (2006.01) |
| *B32B 15/12* | (2006.01) |
| *B32B 15/20* | (2006.01) |

(52) U.S. Cl.
CPC ............... *B32B 7/06* (2013.01); *B32B 7/12* (2013.01); *B32B 15/02* (2013.01); *B32B 15/12* (2013.01); *B32B 15/20* (2013.01); *C23C 4/06* (2013.01); *C23C 4/08* (2013.01); *C23C 4/131* (2016.01); *C23C 4/18* (2013.01); *B32B 2255/06* (2013.01); *B32B 2255/20* (2013.01); *B32B 2307/714* (2013.01); *B32B 2307/748* (2013.01); *Y10T 428/24372* (2015.01)

(58) Field of Classification Search
CPC .. C23C 4/06; C23C 4/067; C23C 4/10; C23C 4/11; C23C 4/123; B05D 5/02
USPC ................................. 427/455, 453, 208, 143
See application file for complete search history.

(56) References Cited

U.S. PATENT DOCUMENTS

| | | | |
|---|---|---|---|
| 3,017,689 A | * | 1/1962 | Link et al. .................... 428/639 |
| 3,020,182 A | | 2/1962 | Daniels |
| 3,023,490 A | | 3/1962 | Davison |
| 3,087,240 A | | 4/1963 | Gross |
| 3,091,548 A | | 5/1963 | Dillon, II |
| 3,112,212 A | | 11/1963 | Holowaty et al. |
| 3,150,937 A | | 9/1964 | Link et al. |
| 3,844,729 A | | 10/1974 | Sedlatschek et al. |

(Continued)

*Primary Examiner* — Dah-Wei D Yuan
*Assistant Examiner* — Nga Leung V Law
(74) *Attorney, Agent, or Firm* — Fox Rothschild LLP

(57) ABSTRACT

A method for forming a friction coating construction which utilizes the providing of a mixture of molten metal material with abrasive particles dispersed therethroughout in particulant form which is sprayed onto a flexible substrate which is of a metallic material being preferably ductile which is then allowed to harden and cool to allow the molten metal to affix the flexible support layer with respect to the metal material and with respect to the abrasive particles dispersed therethroughout thereby providing an enhanced friction control surface which can optionally include an adhesive layer on the surface of the flexible substrate positioned oppositely from the abrasive particles to allow this layer to be affixed to any subsurface surface which needs enhanced control of the coefficient of friction thereto.

17 Claims, 1 Drawing Sheet

(56) References Cited

U.S. PATENT DOCUMENTS

| | | | |
|---|---|---|---|
| 4,029,852 A | 6/1977 | Palena | |
| 4,148,971 A | 4/1979 | Kawano et al. | |
| 4,610,698 A | 9/1986 | Eaton et al. | |
| 4,744,725 A | 5/1988 | Matarese et al. | |
| 4,961,973 A | 10/1990 | Molnar | |
| 4,987,003 A | 1/1991 | Schuster et al. | |
| 4,992,337 A | 2/1991 | Kaiser et al. | |
| 5,077,137 A | 12/1991 | Molnar | |
| 5,133,126 A | 7/1992 | Matsuoka | |
| 5,475,951 A | 12/1995 | Litzow | |
| 5,763,070 A | 6/1998 | Kerlek et al. | |
| 5,863,617 A | 1/1999 | Piontek | |
| 6,190,740 B1 * | 2/2001 | Rogers | 427/446 |
| 6,318,033 B1 | 11/2001 | Birch et al. | |
| 6,372,362 B1 | 4/2002 | Furuichi et al. | |
| 6,428,858 B1 | 8/2002 | Bolton et al. | |
| 6,635,220 B2 | 10/2003 | Furuichi et al. | |
| 6,665,987 B2 | 12/2003 | Eve et al. | |
| 6,863,932 B2 | 3/2005 | Molnar et al. | |
| 6,916,375 B2 | 7/2005 | Molnar et al. | |
| 7,191,568 B1 | 3/2007 | Choate | |
| 7,273,669 B2 | 9/2007 | Grinberg et al. | |
| 2001/0025457 A1 * | 10/2001 | Tselesin | B23D 61/021 51/293 |
| 2003/0175429 A1 * | 9/2003 | Molnar | B60P 3/14 427/307 |
| 2009/0193743 A1 * | 8/2009 | Wiercinski | 52/408 |

* cited by examiner

ENHANCED FRICTION COATING CONSTRUCTION AND METHOD FOR FORMING SAME

The present utility application hereby formally claims priority of U.S. Provisional Patent application No. 61/600,306 filed Feb. 17, 2012, on "Improved Skateboard Deck And Method Of Making Same" filed by the same inventor listed herein, namely, Charles R. Ligon, and said referenced provisional application is hereby formally incorporated by reference as an integral part of the present application.

BACKGROUND OF THE INVENTION

1. Field of the Invention

The present invention deals with the field of enhancing slip resistance by forming non-skid flexible metal surfaces in areas such as on floors, walkways, ladders, scaffolding, pool decks and in many other similar areas, especially where a flexible non skid surface is required. The creation of non-skid surfaces is normally provided by bonding an abrasive or similar material directly to the desired surface or by forming it with a backing layer which can then be attached to any area or surface which requires such enhancement of the coefficient of friction thereof. The present invention includes an improved product which is can be made available in a tape-form such that it can be provided commercially in rolls to facilitate use and allow the product to be used for many different applications when formed in accordance with the herein defined process.

2. Description of the Prior Art

Many prior art designs have been patented for the purpose of providing friction controlled or enhanced surfaces such as shown in U.S. Pat. No. 3,017,689 patented Jan. 23, 1962 to H. S. Link et al on an "Anti-Skid Tread Plate" and assigned to United States Steel Corporation; and U.S. Pat. No. 3,020,182 patented Feb. 6, 1962 to F. W. Daniels on a "Ceramic-To-Metal Seal And Method Of Making The Same" and assigned to General Electric Company; and U.S. Pat. No. 3,023,490 patented Mar. 6, 1962 to C. H. Dawson on "Armored Metal Articles With A Thin Hard Film Made in Situ And Conforming To The Exact Contour Of The Underlying Surface" and assigned to Dawson Armoring Company; and U.S. Pat. No. 3,087,240 patented Apr. 30, 1963 to M. W. Gross on a "Method Of Making Ceramic-To-Metal Composite Stock" and assigned to Texas Instruments Incorporated; and U.S. Pat. No. 3,091,548 patented May 28, 1963 to H. P. Dillon II on "High Temperature Coatings" and assigned to Union Carbide Corporation; and U.S. Pat. No. 3,112,212 patented Nov. 26, 1963 to M. O. Holowaty et al on "Non-Skid Metal Sheets" and assigned to Inland Steel Company; and U.S. Pat. No. 3,150,937 patented Sep. 29, 1964 to H. S. Link et al on an "Anti-Skid Tread Plate" and assigned to United States Steel Corporation; and U.S. Pat. No. 3,844,729 patented Oct. 29, 1974 to K. Sedlatschek et al on "Metals Having Wear-Resistant Surfaces And Their Fabrication" and assigned to Schwarzkopf Development Corporation; and U.S. Pat. No. 4,029,852 patented Jun. 14, 1977 to Maximilian Palena on a "Metal Non-Skid Coating"; and U.S. Pat. No. 4,148,971 patented Apr. 10, 1979 to H. Kawano et al on "Flame Spraying Materials And Process For Producing The Same" and assigned to Hitachi Cable, Ltd.; and U.S. Pat. No. 4,610,698 patented Sep. 9, 1986 to H. E. Eaton on an "Abrasive Surface Coating Process For Superalloys" and assigned to United Technologies Corporation; and U.S. Pat. No. 4,744,725 patented May 17, 1988 to A. P. Matarese et al on an "Abrasive Surfaced Article For High Temperature Service" and assigned to United Technologies Corporation; and U.S. Pat. No. 4,961,973 patented Oct. 9, 1990 to W. S. Molnar on "Articles With Slip Resistant Surfaces And Method Of Making Same" and assigned to W. S. Molnar Co.; and U.S. Pat. No. 4,987,003 patented Jan. 22, 1991 to D. M. Schuster et al on a "Production Of Aluminum Matrix Composite Coatings On Metal Structures" and assigned to Alcan International Limited; and U.S. Pat. No. 4,992,337 patented Feb. 12, 1991 to John J. Kaiser et al on "Electric Arc Spraying Of Reactive Metals" and assigned to Air Products and Chemicals, Inc.; and U.S. Pat. No. 5,077,137 patented Dec. 31, 1991 to William S. Molnar on "Articles With Slip Resistant Surfaces And Method Of Making Same" and assigned to W. S. Molnar Co.; and U.S. Pat. No. 5,133,126 patented Jul. 28, 1992 to T. Matsuoka on a "Method Of Producing Aluminum Tube Covered With Zinc" and assigned to Furukawa Aluminum Co., Ltd.; and U.S. Pat. No. 5,475,951 patented Dec. 19, 1995 to M. R. Litzow on a "Skid Resistant Surface And Its Preparation" and assigned to Safeguard Technology, Inc.; and U.S. Pat. No. 5,763,070 patented Jun. 9, 1998 to J. G. Kerlek et al on an "Article Having Moisture-Resistant Safety Surface And Method Of Preparation" and assigned to Safeguard Technology, Inc.; and U.S. Pat. No. 5,863,617 patented Jan. 26, 1999 to E. A. Piontek on a "Portable Metal Bonded Anti-Slip Coating Application Process" and assigned to Harsco Technologies Corporation; and U.S. Pat. No. 6,190,740 patented Feb. 20, 2001 to F. S. Rogers on an "Article Providing Corrosion Protection With Wear Resistant Properties"; and U.S. Pat. No. 6,318,033 patented Nov. 20, 2001 to L. L. Birch et al on a "Staircase, Staircase Repair Device And Methods Of Fabricating Same" and assigned to Tread Ex, Inc.; and U.S. Pat. No. 6,372,362 patented Apr. 16, 2002 to S. Furuichi et al on a "Method For Forming Composite Vapor-Deposited Films With Varied Compositions Formed In The Initial And Final Stages Of Deposition, Composite Vapor-Deposition Material For The Film. And Method For Manufacture Thereof" and assigned to Hitachi Metals, Ltd.; and U.S. Pat. No. 6,428,858 patented Aug. 6, 2002 to J. B. Bolton et al on a "Wire For Thermal Spraying System"; and U.S. Pat. No. 6,635,220 patented Oct. 21, 2003 to S. Furuichi et al on a "Method For Forming Composite Vapor-Deposited Films With Varied Compositions Formed In The Initial And Final Stages Of Deposition, Composite Vapor-Deposition Material For The Film And Method For Manufacture Thereof" and assigned to Hitachi Metals, Ltd.; and U.S. Pat. No. 6,665,987 patented Dec. 23, 2003 to J. S. Eve et al on a "Staircase, Staircase Repair Device And Methods Of Fabricating Same" and assigned to Tread Ex, Inc.; and U.S. Pat. No. 6,863,932 patented Mar. 8, 2005 to W. S. Molnar et al on a "Method Of Making An Anti-Slip Coating And An Article Having An Anti-Slip Coating" and assigned to W. S. Molnar Company; and U.S. Pat. No. 6,916,375 patented Jul. 12, 2005 to W. S. Molnar et al on a "Portable Manufacturing Facility For Manufacturing Anti-Slip Flooring And Method Of Manufacturing" and assigned to W. S. Molnar Company; and U.S. Pat. No. 7,191,568 patented Mar. 20, 2007 to N. Choate on a "Modular Safety Surface And Method For Preparing The Same"; and U.S. Pat. No. 7,273,669 patented Sep. 25, 2007 to G. Grinberg et al on "Spray-Formed Articles Made Of Pseudo-Alloy And Method For Making The Same" and assigned to Ford Global Technologies, LLC.

SUMMARY OF THE INVENTION

The present invention defines a metal friction coating construction which is extremely durable and is capable of being positioned upon a subsurface such as a skateboard, ladder rungs, surfboard, steps or a walkway or the like for enhancing frictional characteristics thereof. This metal friction coating construction comprises a flexible substrate with a ductile metal material and a plurality of abrasive tungsten carbide and ceramic particles positioned thereon. The formed abrasive surfacing material is purposefully flexible due to the, preferably woven nature of the flexible substrate and the ductile natural of the metal with which it is bonded. Initially the ductile metal material is melted, atomized and heated by a thermal spray gun and is mixed with a plurality of abrasive particles and the resulting mixture or particulant is then sprayed upon the substrate allowed to harden and cool to form a harden metal layer with enhanced friction characteristics with the abrasive particles dispersed therethroughout in an array. The flexible substrate and the ductile hardened metal material allow the final high friction construction to be flexible overall. An adhesive layer can then be applied to the undersurface of the flexible substrate at a location oppositely positioned relative to the abrasive particles in order to facilitate selective securement of the friction coating construction to a subsurface. A paper backing may be applied across the adhesive layer for protection thereof such that this releasable paper can be removed immediately prior to placement to achieve firm securement of the metal friction coating construction of the present invention with respect to the desired portion of any subsurface for enhancing the coefficient of friction thereof.

This flexible metal friction coating construction of the present invention can be applied by the unique method disclosed in the present invention wherein a flexible substrate is initially provided and then a ductile molten metallic metal material and a plurality of abrasive particles are provided through spraying by a thermal spray gun. The thermal spray gun melts and atomizes the metallic material thereof to form a molten metal material. A plurality of abrasive particles are dispersed throughout the molten metal material. The thermal spray gun then sprays mixture of molten ductile metal material with abrasive particles dispersed therethroughout directly onto the flexible substrate. The molten metal material solidifies after being applied onto the flexible substrate It then is allowed to cool such as by being exposed to through normal ambient environmental temperatures and conditions and forms a hardened metal layer of ductile metal material which is bonded to the flexible substrate with abrasive particles distributed throughout the harden metallic layer. The metal material bonds to the flexible metal substrate because it is in a molten state when initially being sprayed onto the substrate by the thermal spraying apparatus.

It is an object of the ductile metal friction coating construction and method for forming thereof of the present invention to provide a long lasting flexible non-skid metal material which can be provided in the form of a tape which is selectively attachable to any subsurface which can be flat or curved such as floors, ramps, ladder rungs etc. for enhancing the frictional characteristics thereof.

It is an object of the metal friction coating construction and method for forming thereof of the present invention to provide a safety tape or grip tape or non-slip tape usable in a variety of different applications.

It is an object of the metal friction coating construction and method for forming thereof of the present invention to rigidly attach a mixture of abrasive particles with respect to a flexible substrate using a ductile metal material wherein the abrasive particles are affixed in place with respect thereto to prevent the particles from being dislodged therefrom.

It is an object of the metal friction coating construction and method for forming thereof of the present invention to provide a non-slip tape applicable to various surfaces which is wear resistant.

It is an object of the metal friction coating construction and method for forming thereof of the present invention to provide a friction coating construction which can be applied wherever needed at a minimum cost.

It is an object of the metal friction coating construction and method for forming thereof of the present invention to provide friction coating construction which is relatively inexpensive and has significant longevity.

It is an object of the metal friction coating construction and method for forming thereof of the present invention which can be thermally bonded together while making use of conventional thermal spraying techniques.

It is an object of the metal friction coating construction and method for forming thereof of the present invention to provide enhanced performance and which minimizes wasting of the component materials thereof.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
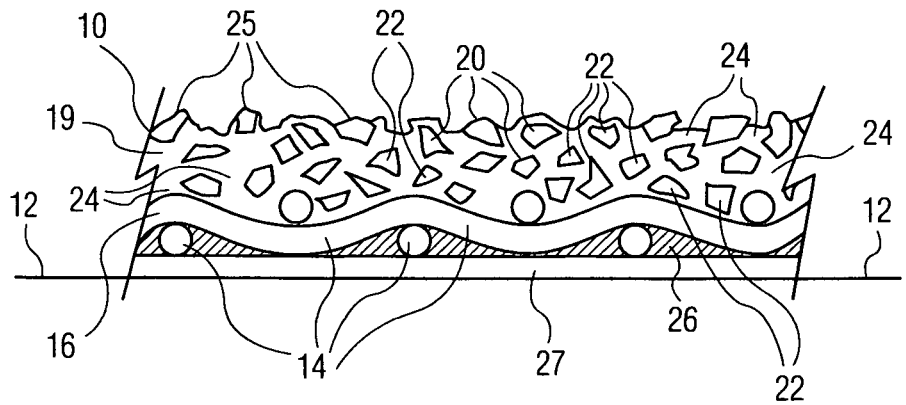
FIG. 1 is a cross-section view of an embodiment of the friction coating construction of the present invention.

The present invention discloses a unique metal friction coating construction 10 which can be securable with respect to any subsurface 12 such as a skateboard or a step of a staircase or a ladder step wherein enhancement of the frictional characteristics of the subsurface 12 is desired, particularly when required for safety purposes.

The configuration of the metal frictional coating construction includes a flexible substrate 14 which can preferably be formed as a woven material and is, preferably, a woven wire cloth of stainless steel having a range of mesh sizes extending approximately from 120×120 to 150×150. In this manner the apertures in the mesh will retained the abrasive particles since they will usually be too large to pass therethrough. This woven support member will also be sufficiently flexible to impart substantial flexibility to the finally formed metal friction coating construction 10.

A metal material which is preferably of a corrosive resistant material and is somewhat ductile, such as an aluminum-based material or alloy thereof, will be made molten in any convenient manner such as with the use of a thermal spraying apparatus 37. The thermal spray gun will receive the metallic material provided therein preferably through wire or wires 30 which can also be provide with abrasive particles therein. Alternatively, the present invention also contemplates that the abrasive particles can be provided separately from the wires 30. The metal material 16 when heated will become a molten metal material 18 and the abrasive particles 20 will become distributed therethroughout or dispersed therethroughout as the metal material 16 becomes molten. This mixture of molten metal material 16 and particles 20 will be formed into an atomized particulant 38 by the thermal spraying apparatus 37. Particulant 38 will be urged to exit the thermal sprayer nozzle 34 and will be sprayed onto the flexible substrate 14. The construction of the thermal spraying apparatus 37 will include the wire feed rollers 32 which will, preferably, provide two pinch rollers 32 for each wire 30 feeding therein. The wire feed rollers 32 will guide the wire or wires 30 toward the thermal spraying heat generating area 40.

Figure 2:
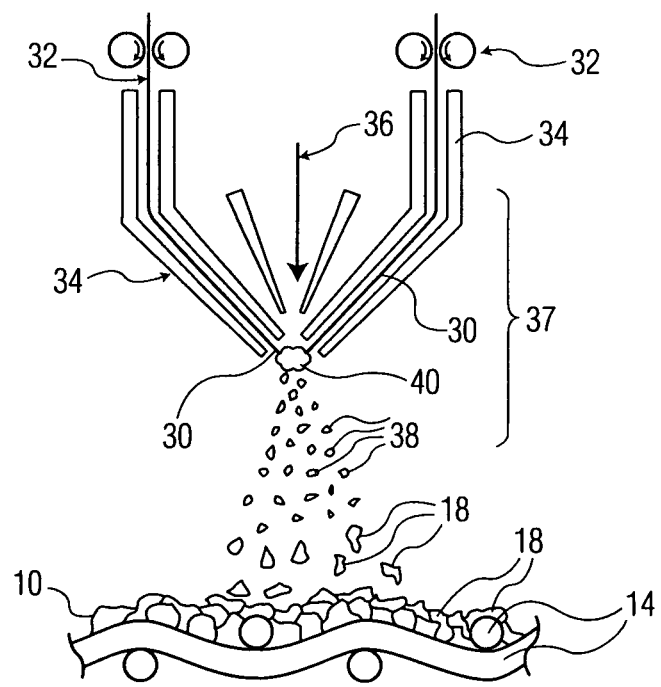
FIG. 2 is a cross-sectional view showing the parts of a thermal sprayer apparatus during performing of the steps of this embodiment of the processing method of the present invention.

In one preferred embodiment of the thermal spraying apparatus 37 of the present invention two wires will be provided as shown in FIG. 2 wherein one wire is positively charged and one wire is negatively charged. When these two wires are brought adjacent to one another at the tip of the thermal spraying nozzle 34 the opposite polarity therebetween will create the heat generating area 40. This area 40 will be capable of generating a significant amount of heat which will melt the metal material 16 and mix it with the abrasive particles 20 immediately adjacent to the tip of the sprayer nozzle 34. Usually in such thermal spray guns 37 the metal material 16 and the abrasive particles 20 will both be supplied within the structure of the wires 30 or within the interior of the wire to facilitate mixing thereof once the metal material 16 has been heated and is formed into a molten metal material 18. This molten metal material 18 with the abrasive particles 20 distributed therethroughout is defined as the atomized particulant 38. Urging of movement of the atomized particulant 38 toward the flexible substrate 14 is usually achieved by an air supply 36 which moves through the thermal sprayer nozzle 34. The high air velocity tends to urge the atomized particulant 38 formed in the sprayer 37 to move toward the surface of flexible substrate 14 as seen best in FIG. 2. The particulant 38 will normally expand outwardly normally into a wider spray pattern shaped as an inverted cone as it exits the sprayer and moves toward the surface of the flexible substrate 14. This is an important step during the process of the present invention.

Once the atomized particulant 38 is sprayed upon the surface of the flexible substrate 14, the molten metal material 18 will tend to gravitate downwardly toward the substrate member 14 therebelow through the interstices 24 between the abrasive particles. In this manner the metal 18 while still molten will fill these interstitial areas 24 between the individual abrasive particles 20 which are dispersed throughout the molten material 18 immediately after the spray reaches the upper surface of the flexible substrate. This propelled movement of the molten metal material 18 will cause some exposed portions 25 of the abrasive particles 20 to be at positions protruding at least partially through the surface of the molten metal material 18 as it cools and hardens. As shown in FIG. 1 some of the abrasive particles 20 will indeed have exposed portions 25 and other abrasive particles such as those identified by reference numerals 22 will be completed encapsulated within the molten metal. Each of the protruding and encapsulated abrasive particles will tend to enhance the abrasive characteristics of the finally formed metal friction coating construction 10.

The molten metal will then cool and harden to form a hardened metal material layer 19 which is flexible due to the ductile characteristics thereof and which is fixedly adhered to the flexible substrate 18 and to the array 22 of dispersed abrasive particles 20 located therethroughout. This cooling is preferably achieved by exposing of the sprayed molten metal material 18 to the temperatures of the adjacent ambient environment which will naturally achieve cost effective cooling thereof.

Once the metal material 19 is completely cooled and hardened a paper backed adhesive layer 26 is preferably attached to the undersurface of the flexible woven wire cloth substrate 14 with the paper layer 26 adhered to the lower portion of the adhesive layer 26. In this manner the releasable paper layer 27 can be removed immediately prior to use when the metal friction coating construction 10 of the present invention is placed adjacent to a subsurface 10 for the purpose of adherence thereto. In this manner enhanced control of the frictional characteristics of the desired portion of the subsurface with which it is being used can be achieved.

The metal friction coating construction 10 will, preferably, be mounted using an adhesive which is paper backed and this configuration will allow the material to be easily supplied in roll form or other format wherein contamination of the adhesiveness of the adhesive payer will be prevented. In this manner the present invention will provide an improved flexible non-skid metal tape or similar construction which is corrosive resistant due to the use of corrosive resistant metals for the metal material 16 such as aluminum or aluminum based alloys. It is also important that the flexible substrate 14 be sufficiently flexible and, as such, it is provided preferably in a woven form best made from stainless steel. Such materials will easily adhere to the aluminum based materials or aluminum alloy material which are commonly chosen for the metal material 16 which is sprayed thereon. Adherence between the metal material 16 and the flexible substrate 14 is an important aspect of the present invention such that can be easily achieved by the use of a thermal spraying gun 37.

The thermal spraying apparatus 37 used with the present invention can be chosen from a variety of different constructions commonly known in the industry such as, for example, the "twin wire arc" or "wire flame spray". These thermal guns allow for spraying of a ductal molten metal material such as material 18 which is required in order to provide a formed hardened metal material 19 which has some flexibility. Aluminum based materials are used for this sprayed metal material 16 primarily because they are ductal as well as being corrosive resistant once the hardened metal material layer 19 is formed.

It should be appreciated that the present invention can also be utilized using a zinc-based alloy for the metal material 16, particularly in those applications, for example, wherein the flexible substrate 14 is made of a non-metallic material. Furthermore, the present invention also contemplates the use of other flexible metal materials for the flexible substrate that are easily bondable to a molten metal material 18 and will prevent the movement of abrasive particles 20 therethrough.

While particular embodiments of this invention have been shown in the drawings and described above, it will be apparent that many changes made be made in the form, arrangement and positioning of the various elements of the combination. In consideration thereof, it should be understood that preferred embodiments of this invention disclosed herein are intended to be illustrative only and not intended to limit the scope of the invention.

I claim:

1. A method for forming a flexible friction coating construction, said method comprising:
   melting aluminum or an aluminum alloy to form a molten metal material;
   dispersing a plurality of abrasive particles throughout said molten metal material to form a mixture;

spraying said mixture directly into abutment with a stainless steel wire mesh flexible substrate having apertures defined within the mesh, to form a pre-construction containing molten metal and a plurality of abrasive particles; and hardening of the molten metal of said pre-construction to adhere the plurality of abrasive particles to the flexible wire mesh substrate such that the resulting construction remains flexible, wherein said apertures are smaller than the size of said abrasive particles in order to prevent said abrasive particles from passing through said stainless steel wire mesh flexible substrate.

2. The method according to claim 1 wherein said stainless steel wire mesh flexible substrate is woven.

3. The method according to claim 1 wherein said step of dispersing the abrasive particles throughout the molten material to form a mixture and said step of melting aluminum or an aluminum alloy to form a molten metal material are performed simultaneously.

4. The method according to claim 2 wherein, after spraying and prior to hardening, the molten metal material of said pre-construction is directed to flow between the abrasive particles and into abutment with the stainless steel wire mesh flexible woven member such that portions of said abrasive particles are exposed facing and extending outward away from the metal material after hardening thereby enhancing the coefficient of friction of the finally formed friction coating construction.

5. The method according to claim 1 wherein said hardening comprises cooling by exposing said pre-construction to ambient temperature after said spraying of said mixture of molten metal containing a plurality of abrasive particles.

6. The method according to claim 1 wherein said flexible woven stainless steel wire mesh substrate has a mesh size between 150×150 and 120×120, inclusive.

7. The method according to claim 1 further comprising applying an adhesive layer having a releasable paper backing to said friction coating construction opposite to the abrasive particles, to facilitate selective securement of said friction coating construction to a subsurface.

8. The method according to claim 1 wherein said metal material further comprises zinc.

9. The method according to claim 1 wherein said plurality of abrasive particles is selected from the group consisting of aluminum oxide, silicon carbide, cermet, metals, metal alloys, and mixtures of two or more thereof.

10. The method according to claim 1 wherein said steps of melting aluminum or an aluminum alloy to form a molten metal material, dispersing a plurality of abrasive particles throughout the molten metal material to form a mixture, and spraying said mixture directly into abutment with said stainless steel mesh flexible substrate are performed substantially simultaneously using a thermal sprayer.

11. The method according to claim 10 further comprising controlling variations in the coefficient of friction of said friction coating construction by varying the operational characteristics of said thermal sprayer including controlling the temperature of the molten metal material mixture sprayed therefrom, selecting the abrasive particles and metal materials provided thereto, and controlling the angle of spraying with respect to said stainless steel mesh flexible substrate.

12. A method for forming a friction coating construction, said method comprising:

melting aluminum or an aluminum based alloy to form a molten metal material while simultaneously dispersing therein a plurality of abrasive particles selected from the group consisting of aluminum oxide, silicon carbide, cermet, metals metal alloys and mixtures of two or more thereof, to form a mixture;

spraying said mixture directly into abutment with a mesh flexible woven stainless steel substrate having apertures defined within the mesh which are smaller than the particle size of said abrasive particles, to form a pre-construction containing molten metal and a plurality of abrasive particles;

cooling said pre-construction by exposing to ambient temperature to harden and adhere the molten metal to said stainless steel mesh flexible woven substrate together with said abrasive particles such that the hardened pre-construction remains flexible; and applying an adhesive layer having a releasable paper backing to the hardened pre-construction opposite to the abrasive particles, to facilitate selective securement of the friction coating construction to a subsurface.

13. The method according to claim 1 wherein the steps of melting aluminum or an aluminum alloy to form a molten metal material, dispersing a plurality of abrasive particles throughout the molten metal material to form a mixture, and spraying said mixture directly into abutment with said stainless steel mesh flexible substrate are performed substantially simultaneously.

14. The method according to claim 1 wherein said stainless steel mesh flexible substrate is configured and the amount of said molten metal mixture containing a plurality of abrasive particles sprayed thereon is such that the friction coating construction remains flexible after hardening of the molten metal.

15. The method according to claim 12 wherein said mesh flexible woven stainless steel substrate is configured and the amount of said molten metal mixture containing a plurality of abrasive particles sprayed thereon is such that the friction coating construction remains flexible after hardening of the molten metal.

16. The method of claim 1, further comprising rolling said flexible friction coating construction into rolls.

17. The method of claim 12, further comprising rolling said flexible friction coating construction into rolls.

\* \* \* \* \*